July 7, 1925.  1,544,804
B. BYRN ET AL
PISTON RING
Filed March 25, 1924
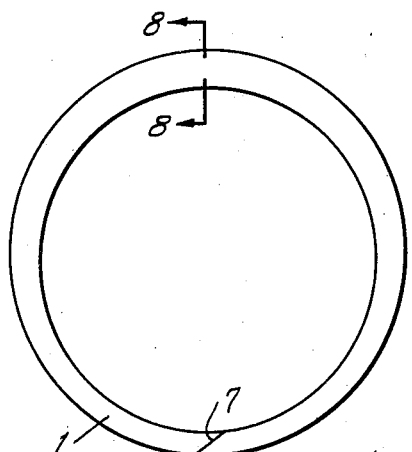
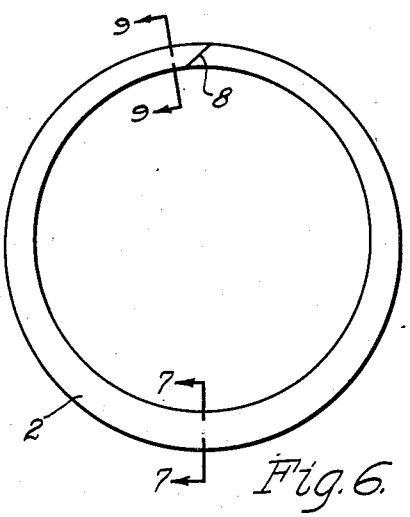
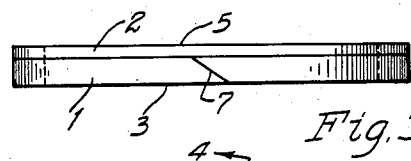
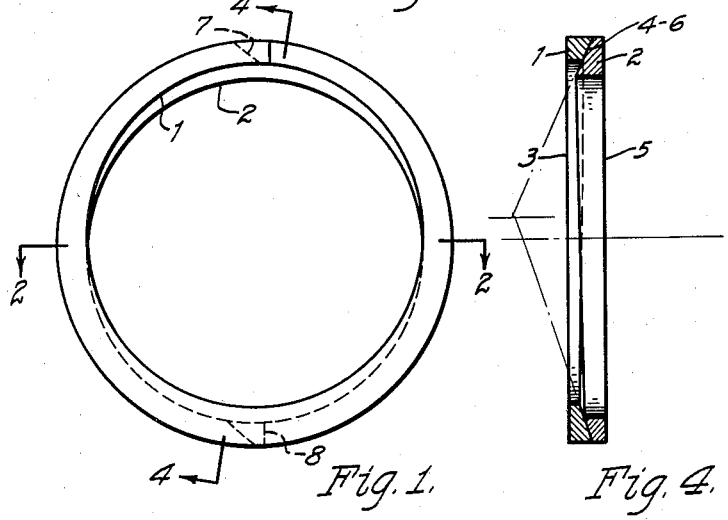
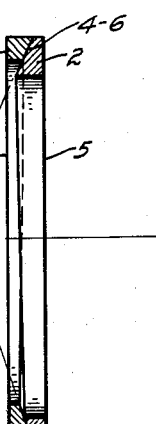
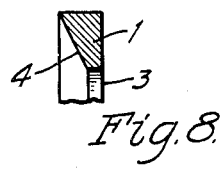
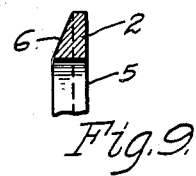
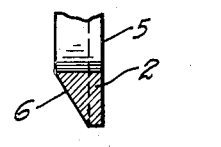
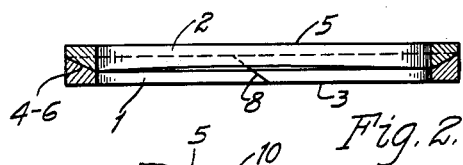
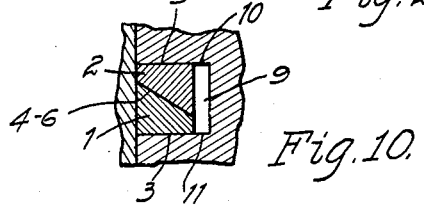
INVENTOR.
BERNARD BYRN,
AND HERBERT DAVIS,
BY
*Robt. D. Pearson*
ATTORNEY.

Patented July 7, 1925.

1,544,804

UNITED STATES PATENT OFFICE.

BERNARD BYRN AND HERBERT DAVIS, OF LOS ANGELES, CALIFORNIA; SAID BYRN ASSIGNOR TO SAID DAVIS.

PISTON RING.

Application filed March 25, 1924. Serial No. 701,743.

*To all whom it may concern:*

Be it known that we, BERNARD BYRN and HERBERT DAVIS, citizens of the Dominion of New Zealand and the Dominion of Canada, respectively, residing at Los Angeles, in the county of Los Angeles and State of California, have invented certain new and useful Improvements in Piston Rings, of which the following is a specification.

Our invention relates to piston rings, particularly useful on gas engine pistons for sealing the contact surfaces between the piston and cylinder.

An important object of our invention is to provide a piston ring constructed to expand against the side walls of the piston grooves, as well as against the inner surface of the cylinder, and thus more effectively seals the piston in the cylinder.

Another object is to provide a piston ring of the character stated comprising two unconnected self aligning ring members for expanding against the inner surface of the cylinder and against the sides respectively of the piston grooves, which maintain themselves in sealing alinement at all times without the use of pins or other devices.

Other objects and advantages will be made manifest in the following specification for an embodiment of the invention illustrated in the accompanying drawing, in which:

Figure 1 is a plan view of our ring assembled.

Figure 2 is a cross section of our ring taken on line 2—2 of Figure 1.

Figure 3 is an end view of our ring.

Figure 4 is a cross section of our ring taken on line 4—4 of Figure 1.

Figure 5 is a plan of one member of our piston ring.

Figure 6 is a plan view of the other ring member of our piston ring.

Figure 7 is a cross section of the ring member taken on line 7—7 of Figure 6.

Figure 8 is a cross section of the ring member shown in Figure 6, taken on line 8—8.

Figure 9 is a cross section of the ring member shown in Figure 6, taken on line 9—9.

Figure 10 is a cross section of our ring and a portion of a piston and cylinder showing the ring in the piston groove.

Our piston ring comprises two split ring members 1 and 2 which are placed one against the other, the inner peripheries of said ring members are eccentric to their outer peripheries. The outer face 3 of the ring member 1 is straight while the inner face 4 of said ring is internally beveled eccentric to the outer periphery of the ring member 1. The outer face 5 of the ring member 2 is straight while the inner face 6 of said member is externally beveled eccentric to the outer periphery of the said member, and fits within and against the beveled surface 4 of the ring member 1, with the narrow and wide portions of the ring member 2 resting respectively opposite the wide and narrow portions of the ring member 1, and with the split 7 of the ring member 1 diametrically opposite the split 8 of ring member 2, which splits are located in the narrow portions of said members respectively.

The ring assembled is placed in a piston groove 9 with the straight faces 3 and 5 of the ring adjacent the straight sides 10 and 11 respectively of said groove 9. If one ring member 1 or 2 should tend to turn with relation to the other ring member, the engagement of the eccentric beveled faces 4 and 6 will tend to force said ring members laterally with relation to each other, which movement will be immediately arrested by the engagement of opposite sides of the ring members with the cylinder wall, whereupon the engagement of said beveled faces will force said ring members axially with relation to each other so that the straight faces 3 and 5 of the ring members will engage the side walls 10 and 11 of the piston groove 9, whereby the piston is effectively sealed in contact with the interior surface of the cylinder, and the side walls of the piston groove, and the splits 7 and 8 are thereby held opposite one another by the wedge effect of the bevel faces 4 and 6 on one another when positioned in the said groove 9.

Having thus described our invention what we claim is:

1. A piston ring comprising two split ring members formed with interengaging continuous eccentrically beveled inner faces, as set forth.

2. A piston ring comprising a pair of split ring members formed with interengaging continuous eccentrically beveled inner faces, the ring members being placed with the narrow and wide portions of each member opposite the wide and narrow portions respectively of the other member, as set forth.

3. A piston ring comprising a pair of split ring members formed with interengaging continuous eccentrically beveled inner faces, the ring members being placed with the narrow and wide portions of each member opposite the wide and narrow portions respectively of the other member, the ring members being split through their narrow portions, as set forth.

4. A piston ring comprising a pair of split ring members formed with interengaging conical surfaces, the inner periphery of the ring members being eccentric to the outer periphery thereof, the splits in the ring members being located in the narrow portions thereof and the ring members being placed with the narrow portion of one ring member upon the wide portion of the outer ring member, and said conical surfaces being continuously eccentric to the outer peripheries of the ring members.

In testimony whereof we affix our signatures.

BERNARD BYRN.
HERBERT DAVIS.